(12) United States Patent
Müller et al.

(10) Patent No.: US 11,320,054 B2
(45) Date of Patent: May 3, 2022

(54) PINCHING DEVICE

(71) Applicant: DrM, Dr. Müller AG, Männedorf (CH)

(72) Inventors: Patrick Müller, Meilen (CH); Kevin Wetter, Teufen (CH)

(73) Assignee: DrM, Dr. Müller AG, Männedorf (CH)

( * ) Notice: Subject to any disclaimer, the term of this patent is extended or adjusted under 35 U.S.C. 154(b) by 0 days.

(21) Appl. No.: 17/041,605

(22) PCT Filed: Apr. 17, 2019

(86) PCT No.: PCT/IB2019/053163
§ 371 (c)(1),
(2) Date: Sep. 25, 2020

(87) PCT Pub. No.: WO2019/202523
PCT Pub. Date: Oct. 24, 2019

(65) Prior Publication Data
US 2021/0025507 A1    Jan. 28, 2021

(30) Foreign Application Priority Data
Apr. 19, 2018   (CH) .................... 00505/18

(51) Int. Cl.
*F16K 7/06* (2006.01)
*F16K 7/04* (2006.01)
(52) U.S. Cl.
CPC ............ *F16K 7/065* (2013.01); *F16K 7/045* (2013.01)
(58) Field of Classification Search
CPC . F16K 7/065; F16K 7/045; F16K 7/06; F16K 7/04; F16K 31/041; F16K 31/04
USPC .................................................... 251/4–10
See application file for complete search history.

(56) References Cited

U.S. PATENT DOCUMENTS 1,914,851 A * 6/1933 Fyfe .................. F16K 7/065
251/4
3,016,915 A * 1/1962 Moeller, Jr. ............ F16K 7/065
251/9
4,177,969 A * 12/1979 Sieber-Muller ......... F16K 7/065
251/9
(Continued)

FOREIGN PATENT DOCUMENTS

CN        205001564 U     1/2016
DE         955 750 C      1/1957
(Continued)

OTHER PUBLICATIONS

International Search Report for International Application No. PCT/IB2019/053163 dated Aug. 9, 2019.

*Primary Examiner* — Craig J Price
*Assistant Examiner* — Andrew J Rost
(74) *Attorney, Agent, or Firm* — McCormick, Paulding & Huber PLLC

(57) ABSTRACT

The invention describes a pinching device for controlling flows in elastic tube lines. The pinching device comprises two wheels, wherein the first wheel is designed as an eccentric wheel and is fastened eccentrically on a drive shaft and the second wheel is fixed in a predefined position relative to the eccentric wheel, wherein the position of the second wheel can be adjusted. The eccentric wheel can be rotated via the drive shaft about the eccentric axis of the eccentric wheel in the direction of the second wheel in order to pinch a tube positioned between the two wheels.

8 Claims, 3 Drawing Sheets

(56) References Cited

U.S. PATENT DOCUMENTS

| | | | | |
|---|---|---|---|---|
| 5,326,033 | A * | 7/1994 | Anfindsen | F16K 7/065 239/61 |
| 6,708,944 | B2 * | 3/2004 | Pfeil | A61M 5/16881 251/6 |
| 6,957,798 | B1 * | 10/2005 | Schmidt | F16K 7/065 251/6 |
| 7,104,275 | B2 | 9/2006 | Dille | |
| 7,309,055 | B1 * | 12/2007 | Spiegel | A61M 1/83 251/6 |
| 7,896,310 | B2 | 3/2011 | Johansson et al. | |
| 7,998,168 | B2 * | 8/2011 | Kleimann, Sr. | B08B 9/027 606/209 |
| 8,286,933 | B2 * | 10/2012 | Hanada | F16K 23/00 251/6 |
| 8,622,365 | B2 | 1/2014 | Fukano et al. | |
| 9,127,773 | B2 * | 9/2015 | Ams | F16K 7/045 |

FOREIGN PATENT DOCUMENTS

| | | |
|---|---|---|
| DE | 199 07 109 A1 | 9/2000 |
| EP | 2 543 914 A1 | 1/2013 |
| EP | 2 668 424 B1 | 12/2014 |
| WO | 02/36998 A2 | 5/2002 |

\* cited by examiner

PINCHING DEVICE

CROSS-REFERENCE TO RELATED APPLICATIONS

This application is a National Stage application of International Patent Application No. PCT/IB2019/053163, filed on Apr. 17, 2019, which claims priority to Swiss Patent Application No. CH 00505/18, filed on Apr. 19, 2018, each of which is hereby incorporated by reference in its entirety.

TECHNICAL FIELD OF THE INVENTION

The invention relates to a pinching device for controlling flows in elastic tube lines.

BACKGROUND OF THE INVENTION

Pinching devices, also known as pinch valves, for controlling the flow in elastic tube lines are well known. An elastic tube is attached to a pinching device and the flow in the tube is controlled by the compression pressure exerted by the pinching device. Pinch valves of this type are often manually operated and are used in laboratories, especially in biological and chemical laboratories. Manually operated pinch valves normally consist of two plates which are pressed together by means of a vise system. Between them is the tube line, which is pinched accordingly.

Other pinch valves have a solenoid coil as actuator, which uses a pin to pinch the tube. Due to the limited mechanical force that can be generated by such a magnetic field, such pinch valves can only be used for small tube diameters. In particular, they have the disadvantage that the driving force is not sufficient to pinch pressurized tube lines. Such pinch valves are described in U.S. Pat. Nos. 7,896,310, 7,104,275, 8,622,365 and EP 2668424, for example.

Pinch valves driven by motor and transmission are also known. They can generate higher forces. As with manual pinch valves, two straight pins are pressed together to pinch the tube.

The disadvantage of the known systems is that the edges of the tube are exposed to very high forces, while the center is pressed less strongly. This can lead to incomplete closure or, due to premature wear, to short operating times of the tube.

Most known tube pinch valves are combinations of tube and valve body. The valve bodies are normally installed in the tube line by flange connections. This has the disadvantage that the pinch valves are installed at a predetermined position and cannot be moved.

SUMMARY OF THE INVENTION

The present invention now has the object of creating a pinching device which increases the operating times of tube lines, which enables the control of flows in pressurized tube lines, and which can be attached to and removed from a tube line at any point.

This object is solved by a pinching device for controlling flows in elastic tube lines comprising two wheels, wherein the first wheel is designed as an eccentric wheel and is fastened eccentrically on a drive shaft, and the second wheel is fixed in a predetermined position relative to the eccentric wheel, wherein the position of the second wheel is adjustable. The eccentric wheel can be rotated via the drive shaft about the eccentric axis of the eccentric wheel in the direction of the second wheel in order to pinch a tube positioned between the two wheels.

The invention has the advantage that the elastic tube line can be compressed by the two wheels with the least possible resistance. This has the advantage that the tube material is subjected to less stress and thus longer operating times are achieved, which plays a central role especially in the case of high alternating stress concerning costs and safety. A further advantage is that the pinching device can be attached at any point on the tube line where the tube is to be pinched without interrupting the tube line. Thus, it can be sold independently of the tube line and is suitable for sterile applications.

The term elastic tube line as used in this disclosure is a tube which consists of an elastic material and which is squeezable. Examples of such materials are elastic plastics such as silicone, natural rubber, ethylene propylene diene rubber (EPDM) or fluoropolymer rubber (FPM). Pressurized tube lines can be laminated with a circular woven textile to absorb higher forces.

Preferably, the edge of the eccentric wheel has a convex shape and the edge of the second wheel has a concave shape. In one embodiment, the convex shape of the eccentric wheel is matched to the concave shape of the second wheel. This means that the two wheel edges are complementary to each other, preferably with a profile having a circular arc. In a preferred embodiment, the concave shape of the second wheel has the shape of a circular arc, and the convex shape of the eccentric wheel is tapered towards the center of the wheel axis with a rounded end. The convex and concave shape of the two wheels allows an even pressure on the tube material, which means less stress on the tube material.

In a preferred embodiment, the eccentric wheel comprises a ring of slidable material, such as polytetrafluoroethylene (PTFE) or polyethylene. This ring is also called a sliding ring. The ring preferably forms the convex shape of the eccentric wheel. In one embodiment, the ring is held in position axially relative to the wheel axis by two disks. The disks can, for example, be attached to the eccentric wheel with screws.

An eccentric wheel is a wheel disk mounted on a shaft, i.e. a drive shaft, with the center of the shaft being outside the center of the wheel.

The eccentric wheel can be turned via the drive shaft around the eccentric axis of the eccentric wheel in the direction of the second wheel. The drive can be carried out in different ways, for example manual, electric, pneumatic or hydraulic. Preferably the drive is electric.

Preferably, the pinching device includes an electric drive for the eccentric wheel. In a preferred embodiment, the pinching device includes an electronic control system for controlling the electric drive. Preferably, the electronic control system is connected to the drive shaft of the eccentric wheel via a motor and a reduction gear. This allows the eccentric wheel to be turned in the direction of the second wheel and the tube by means of a control signal from the electronic control system. The advantage of this embodiment is that a higher pressure force can be exerted on the tube by the drive via a motor and a reduction gear than is the case with known pinching devices. This enables the control of flows even in pressurized tube lines. A pressurized tube line is understood to be a tube to which pressure is applied and to which the flow is carried out via pressure.

In another embodiment, the pinching device comprises a base plate to which the second wheel is attached. Preferably, the second wheel is attached to the base plate via a bushing and a stud bolt. In another embodiment, the second wheel comprises at least two spacer bushings, which allow the position of the second wheel on the base plate to be adjusted. The desired position can be adjusted according to the thickness of the tube.

In one embodiment, the motor or the reduction gear of the motor is fixed to the base plate, preferably screwed on. The eccentric wheel is preferably attached to the reduction gear via the drive shaft.

In another embodiment, the pinching device comprises at least one guide rail with a recess for a tube. This allows the tube to be brought into the desired position and in the desired direction with respect to the two wheels. Preferably, the pinching device comprises two guide rails with the two wheels located between the two guide rails.

In addition, the present invention comprises a method for controlling the pinching device according to the invention, in which the current consumption of the motor is used as control variable for the electronic control system. The more the tube is pinched, the more the current consumption of the motor increases. When the tube is completely compressed, a limit value of the current consumption is reached. This causes a control signal to be sent to the electronic control system and the power supply to the motor to be interrupted. The pinching device and the tube remain closed. To open the pinching device and the tube again and increase the flow in the tube, the power supply is switched on again. The electronic control system controls the electric motor in the opposite direction. Thus, the eccentric wheel is turned in the opposite direction, i.e. counterclockwise, and the cross-section of the tube is increased until the full cross-section is reached.

The pinching device according to the invention is particularly suitable for use in the pharmaceutical industry or in medical technology, especially in biological or chemical laboratories.

Further advantages of the invention follow from the following description, in which the invention is explained in more detail by means of a exemplary embodiment shown in the schematic drawings.

BRIEF DESCRIPTION OF THE DRAWINGS

The drawings show as follows.

In the figures, the same reference numerals have been used for the same elements, and initial explanations apply to all figures unless explicitly stated otherwise.

DESCRIPTION OF THE PREFERRED EMBODIMENTS

Figure 1:
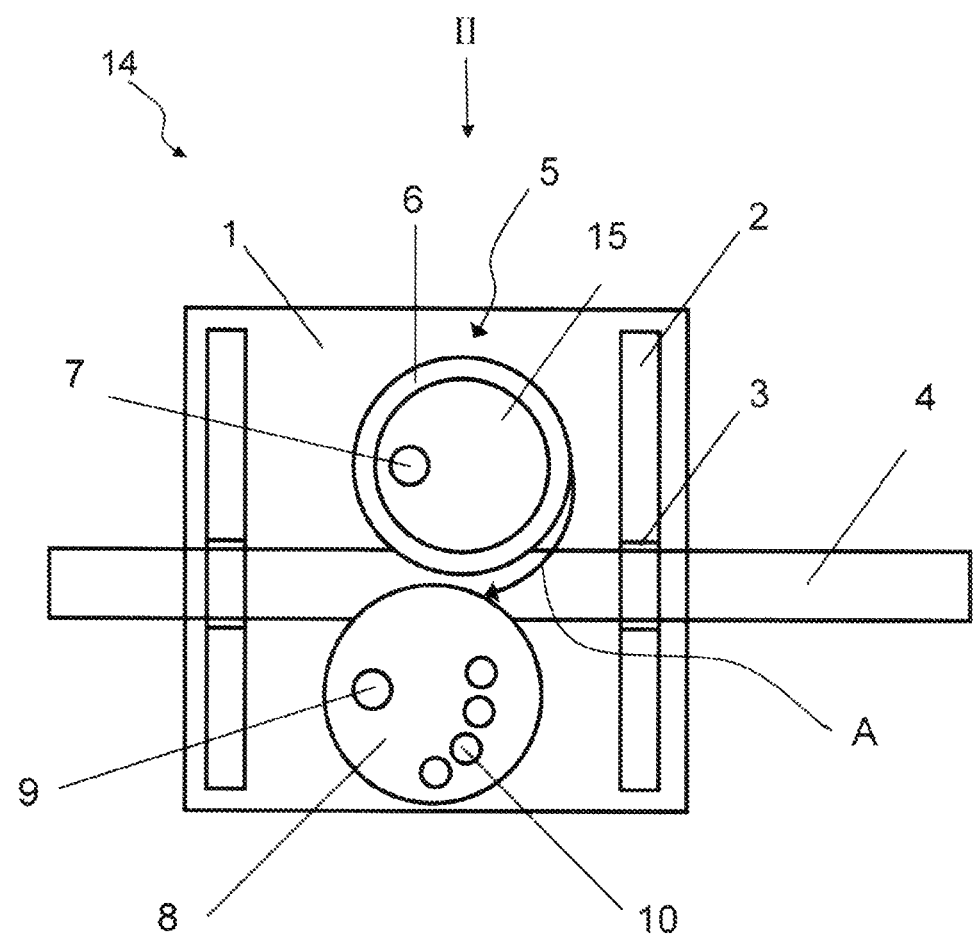
FIG. 1 shows the pinching device in a view from the front.

FIG. 1 shows the pinching device 14 with an eccentric wheel 5 and a second wheel 8. The eccentric wheel 5 is connected via a drive shaft 7 to a reduction gear 11 (shown in FIG. 2) and, in order to pinch the tube 4, can be rotated via the drive shaft 7 around the eccentric axis in the direction of the second wheel 8 in the direction of arrow A. The second wheel is thereby fixed in its position to the eccentric wheel 5. To open the tube 4, the eccentric wheel 5 can be turned in the opposite direction of arrow A. Around the eccentric wheel 5 there is a sliding ring 6, which is held in position axially relative to the wheel axis by two disks 15 (whereof only one is visible). If the eccentric wheel 5 is turned clockwise, the sliding ring 6 presses on the tube 4 and against the second wheel 8, pinching the tube 4 between the two wheels. The second wheel 8 is fastened to the base plate 1 using a bushing 9 and a stud bolt (not shown). The bushing 9 is arranged eccentrically. The position of the second wheel 8 can be adjusted relative to the first wheel around the eccentric axis of the bushing 9. In this exemplary embodiment, the second wheel 8 comprises four spacer bushings 10 which can be used to adjust the position of the second wheel 8 and to adapt it to the tube diameter and fix it in the desired position. In addition, the base plate 1 is shown with two guide rails 2 arranged parallel to each other and fixed to the base plate 1. The guide rails 2 with the recesses 3 serve to guide a tube 4 into position.

Figure 2:
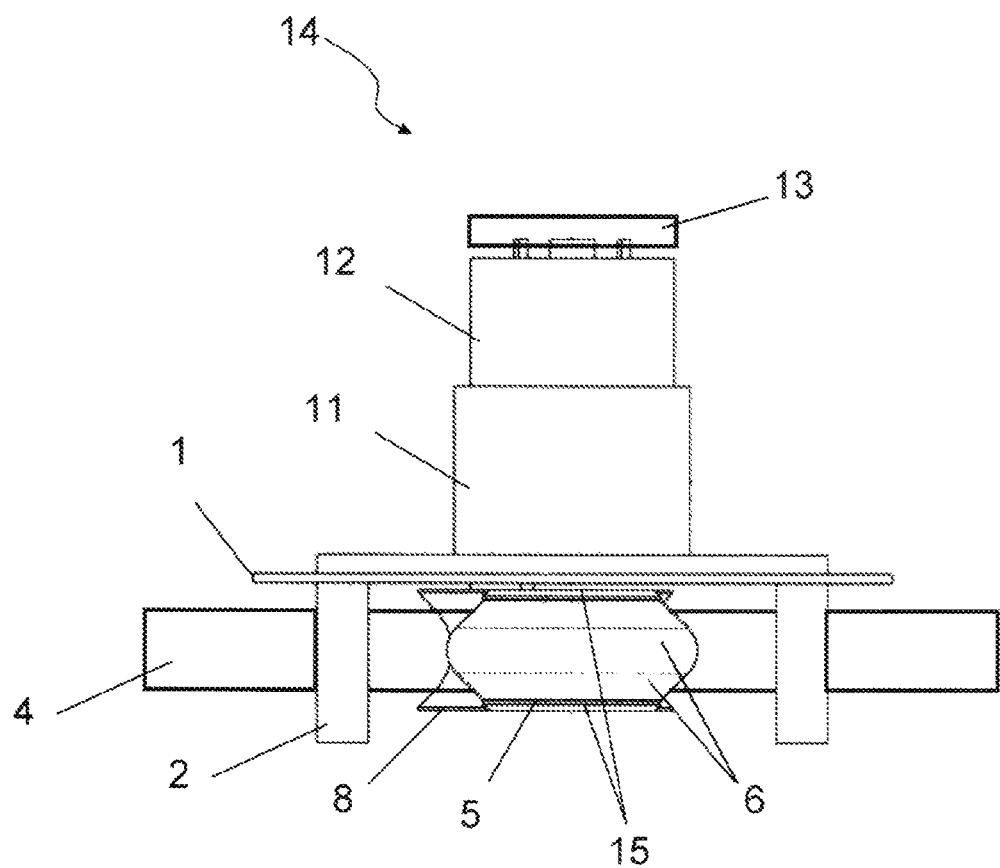
FIG. 2 shows the pinching device in a view from above according to II, as shown in FIG. 1.

FIG. 2 shows the pinching device 14 as described in FIG. 1 with the reduction gear 11, the motor 12 and the electronic control system 13. To close the flow in the tube line 4, a control signal can be given to the electronic control system 13 which switches on the motor 12. This motor drives the eccentric wheel 5 via the reduction gear 11 and the drive shaft 7 and presses via the convex ring 6 on the center axis of the tube line 4. Thus, the center axis of the tube can be deformed towards the second wheel 8. The convex shape of the wheel edge of the eccentric wheel 5 has a profile which is tapered towards the center of the wheel axis and has a rounded end. The tube 4 presses against the concave shape of the second wheel 8 until the tube cross-section is closed. The concave shape of the wheel edge of the second wheel 8 has a circular arc profile. A central role in this process is played by the sliding ring 6, which is made of a slidable material and is held in position by two disks 15 to prevent it from slipping off the eccentric wheel 5. This greatly reduces the axial frictional resistance that builds up during the pinching process. If the sliding ring 6 is in contact with the tube 4 to be pinched, the sliding ring 6 remains in position relative to the tube 4, so that essentially no friction occurs between tube 4 and sliding ring 6. If the eccentric wheel 5 continues to rotate, the eccentric wheel 5 moves relative to the sliding ring 6, while the sliding ring stops. When the tube 4 is completely compressed, the power consumption of motor 12 increases to such an extent that it can be used as a control variable for the electronic control system to cut off the power supply to motor 12. When the power consumption of motor 12 reaches a limit value, the power supply is interrupted. The tube 4 thus remains closed.

To open the flow, the control signal to the electronic control system is interrupted again. Thus, the electronic control system controls the electric motor and the drive shaft in the opposite direction. Thus, the eccentric wheel turns counterclockwise and the cross-section of the tube increases until the full cross-section is reached again. The motor is switched off by time or an end position signal.

Figure 3:
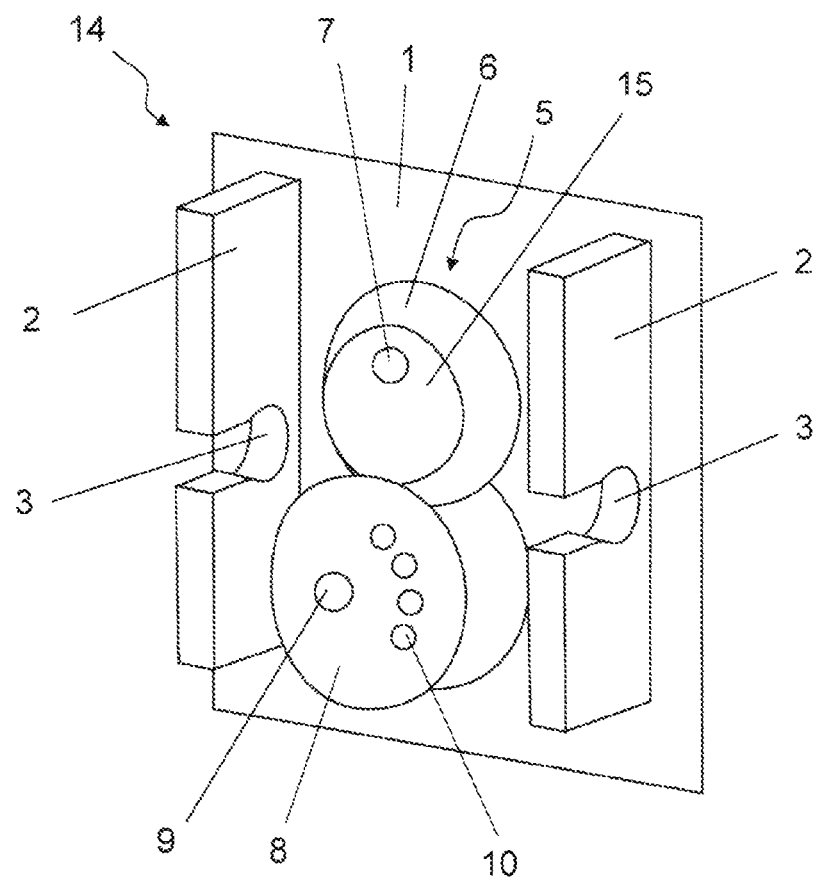
FIG. 3 shows the pinching device in perspective view from the front.

FIG. 3 shows the pinching device 14 with the eccentric wheel 5 and the second wheel 8 as described in FIG. 1. The tube is not shown in FIG. 3. By rotating the drive shaft 7 clockwise, the convex shape of the sliding ring 6 of the eccentric wheel 5 can be moved in the direction of the concave shape of the second wheel 8 with the bushing 9 and the other bushings 10 and pinch a tube. The two guide rails 2 arranged in parallel on the base plate 1 with the recesses 3 for guiding a tube are also shown.

Although various embodiments of the present invention have been described and shown, the invention is not restricted thereto, but may also be embodied in other ways within the scope of the subject-matter defined in the following claims.

The invention claimed is:

1. A pinching device for controlling flows in elastic tube lines, wherein the pinching device comprises two wheels and a base plate, wherein a first wheel of the two wheels is designed as an eccentric wheel having a circular outer periphery and rotatably driven about an eccentric axis offset from a center of the eccentric wheel and within the outer periphery of the eccentric wheel, the outer periphery of the eccentric wheel being defined by a ring slidably mounted on the eccentric wheel for rotation about the center of the eccentric wheel, and a second wheel of the two wheels is arranged in a predetermined position relative to the eccentric wheel and is fixed to the base plate, wherein the position of the second wheel is adjustable, and wherein the eccentric wheel is rotatable via a drive shaft about the eccentric axis of the eccentric wheel in the direction of the second wheel in order to bring a circular outer periphery of the ring on the eccentric wheel into engagement with a tube positioned between the wheels and pinch the tube, wherein the pinching device comprises at least one guide rail with a recess opening on one side to receive the tube and which the at least one guide rail serves to attach the pinching device at any desired position on the tube.

2. The pinching device according to claim 1, wherein a peripheral edge of one of the first and second wheels has a convex shape and a peripheral edge of the other of the first and second wheels has a concave shape.

3. The pinching device according to claim 1, wherein the ring mounted on the eccentric wheel comprises a ring of slidable material having a peripheral edge with a convex shape.

4. The pinching device according to claim 1, wherein the device comprises an electric drive for driving the eccentric wheel via the drive shaft.

5. The pinching device according to claim 4, wherein the electric drive comprises an electronic control system which is connected to the drive shaft via a motor and a reduction gear.

6. A method for controlling the device according to claim 5, wherein current consumption of the motor is used as a control variable for the electronic control system.

7. The pinching device according to claim 1, wherein the second wheel comprises at least two spacer bushings, via which the position of the second wheel on the base plate is adjustable.

8. The pinching device according to claim 1, wherein the pinching device comprises two guide rails, wherein the two wheels are arranged between the two guide rails.

* * * * *